(No Model.)
C. D. SHEPARD.
CENTRIFUGAL LIQUID SEPARATOR.
No. 379,134. Patented Mar. 6, 1888.
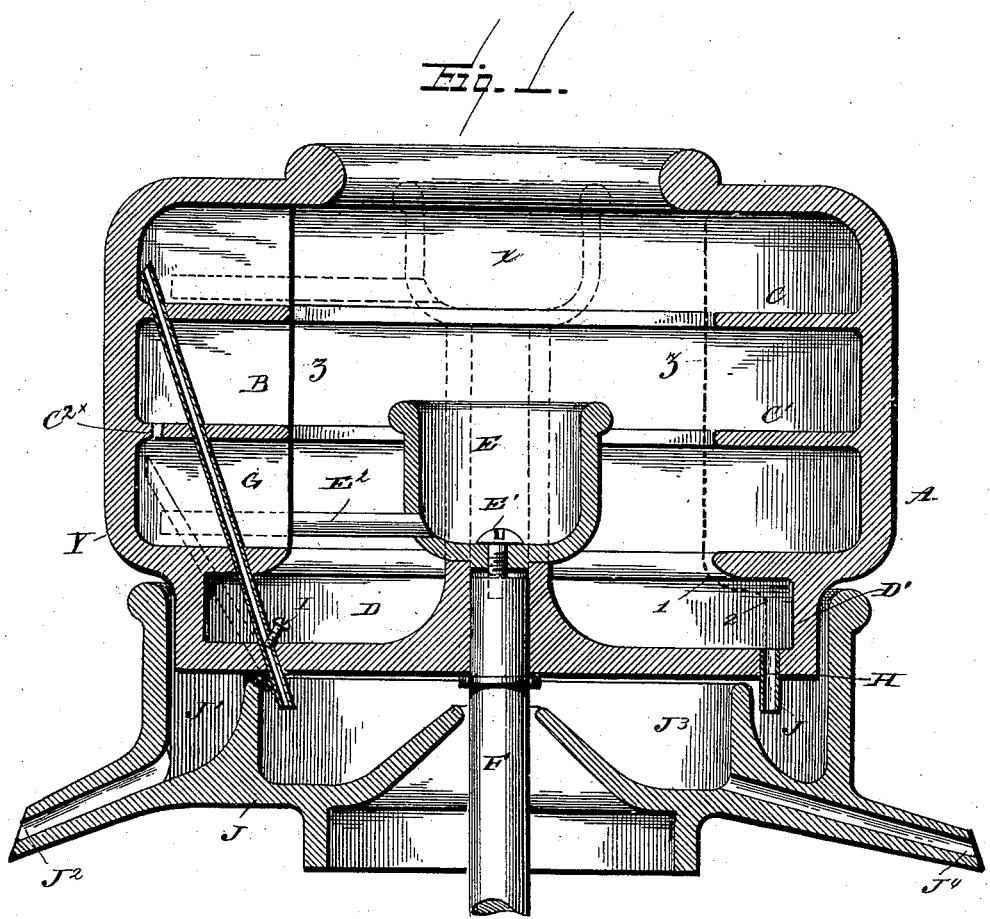
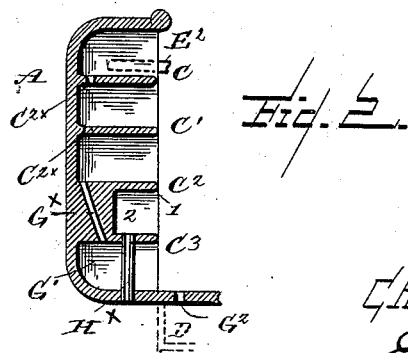
Witnesses:
L. C. Hills,
W. S. Duvall
Inventor:
Charles D. Shepard
E. B. Stocking
Attorney.

UNITED STATES PATENT OFFICE.

CHARLES D. SHEPARD, OF NEW YORK, N. Y.

CENTRIFUGAL LIQUID-SEPARATOR.

SPECIFICATION forming part of Letters Patent No. 379,134, dated March 6, 1888.

Application filed June 4, 1887. Serial No. 240,306. (No model.)

*To all whom it may concern:*

Be it known that I, CHARLES D. SHEPARD, a citizen of the United States, residing at New York, in the county of New York, State of New York, have invented certain new and useful Improvements in Centrifugal Liquid-Separators, of which the following is a specification, reference being had therein to the accompanying drawings.

This invention has relation to centrifugal liquid-separators, and, although hereinafter described with particular reference to the separation of cream from milk, it is understood that the invention may be employed for the separation of any liquid made up of constituents having different specific gravities; and in the following description, although the words "cream" and "milk," are used, the former may be considered the lighter and the latter the heavier constituent of milk, and so, also, these terms may be considered the equivalents one for the other.

The object of this invention is to deliver from the bowl of a separating-machine the heavier constituent of the liquid without passing it or its conductor through the annular wall or body of the lighter constituent, or through that portion of the bowl at which said lighter constituent naturally collects during the operation of the bowl.

Certain features of construction herein shown and described are not claimed, as they form the subject-matter of a companion application, No. 237,612, filed May 9, 1887. The features just referred to have relation to the employment of centrifugal force to expedite the delivery of the lighter constituent.

Referring to the drawings, Figure 1 is a central vertical section of the bowl and receiver of a centrifugal machine embodying my invention. Fig. 2 is a similar section of a portion of a bowl, showing a modified construction which secures the object in view.

Similar letters of reference indicate similar parts in both figures of the drawings.

A represents the bowl proper, and in this instance it is illustrated as being provided with an imperforate vertical blade, B, and a series of shelves, C C', each having a single port, $C^{2 \times}$. The bowl in Fig. 1 is provided with a neck, D, which is extended beyond or outside of the portion of the bowl at which the cream-line is formed.

E represents a feed-cup, secured in position by means of a screw or bolt, E', passing into the spindle F of the machine. A supply-pipe, $E^2$, extends from the bowl at one side of the blade B toward and near to the inner wall of the bowl.

G represents the discharge-pipe for the milk or heavier constituent of a liquid being operated upon by the bowl. A cream-discharge, H, is provided at the bottom of the neck of the bowl.

I represents a regulating-screw, which is seated in and adapted to pass into the bore of the discharge pipe G for the purpose of regulating the amount of liquid which can pass therethrough. The screw I is placed at the upper portion and near the lower end of the pipe G and at such an inclination that it is accessible for adjustment through the open mouth of the bowl, whereby a screw-driver may be inserted into the bowl for the purpose of adjusting the screw. This arrangement of the screw is preferable to any arrangement which necessitates removing the bowl from the spindle or from the machine in order to gain access to the delivery-pipe and its screw.

If desired, the supply cup and pipe may be arranged to deliver the liquid at the top of the bowl, as shown by the dotted lines *x*, in which case the discharge-pipe G would be extended only into the lower compartment of the bowl, as shown by the dotted lines Y.

Now, it being a fact that the cream or lighter constituent will naturally collect in an annular body nearer the center of the bowl than that portion thereof where the heavier constituent is held by centrifugal force, the inner surface of such annular body or wall of the lighter constituent will be about on the dotted lines *z*. In the pending application before mentioned I have illustrated and claimed the construction which involves the neck D, the wall D' of which is extended or arranged outside of the part of the bowl constituting the cream-line *z*, so that the lower shelf projects inwardly beyond and over the neck of the bowl. By this construction centrifugal force acts upon the lighter constituent from about the point 1 to about the point 2, so as to expedite the delivery of the lighter constituent from the bowl. Now in this instance I have placed the discharge H for the lighter constituent a short distance inwardly from the wall B', so that more or less of said constituent may be collected and held against said wall to act as a cushion for the incoming stream thereof, in order that the centrifugal force acting thereon at and between the points 1 and 2 shall not injure the texture or globules of said lighter constituent.

In the modified construction, as illustrated in Fig. 2, I have shown an increased number of shelves, and I may employ a bowl with or without a neck, D, the latter being shown by dotted lines in said Fig. 2. In this construction I apply centrifugal force to the lighter constituent in the second compartment from the bottom of the bowl, the first or lower compartment, G', being employed in this instance as a portion of the conductor through which the heavier constituent is discharged from the bowl. The discharge-port $G^\times$, or the upper portion of said conductor, is formed through a solid portion of the bowl in the said second compartment, as shown at $G^\times$, and the cream-discharge $H^\times$ is formed by inserting the pipe through the bottom of the bowl and through the first shelf above the bottom. In both instances, as shown, the discharge for the lighter constituent, or the cream, is at a point outside of that for the heavier constituent, or milk, in the modification the milk passing around the pipe $H^\times$ through the compartment G' and out through the bottom of the bowl at the port $G^2$.

The receiver J has two compartments—one, J', for the cream, or lighter constituent, with its delivery-spout $J^2$, and the other, $J^3$, for the heavier constituent, with its delivery-spout $J^4$. The pipe G delivers the milk into the compartment $J^3$, and the pipe H the cream into the compartment J'.

Now it will be noticed that in both constructions the heavier constituent is delivered without the passage thereof or its conductor through the annular body of lighter constituent within the bowl, or through that portion of the bowl at which the lighter constituent naturally collects during the operation of the bowl. In other words, the discharge-conductor for the heavier constituent is arranged wholly outside of or behind and below the annular body or wall of the lighter constituent, and hence cannot in any way interrupt the formation thereof or interfere with the same when once formed.

Another advantage of the construction herein shown and described is that no skimmers are required to remove either constituent from the bowl, and that the lighter constituent is delivered finally by the action of gravity—an essential advantage, in that the globules or texture of the same is not injured by its delivery from the bowl.

A great advantage is secured by locating my discharge pipe or conductor wholly back of and passing it below that portion of the bowl in which the cream naturally collects during the operation of the bowl, in that no obstruction to the flow and no "churning" of said cream can be caused by the discharge-pipe.

Having thus fully described my invention and its operation, what I claim is—

1. The bowl provided with a series of shelves with a compartment below and extending laterally beyond the edge of one of the shelves, in combination with a discharge device for the heavier constituent, said device extending from near the wall of the bowl toward its center, and being located back of and below that part of the bowl in which the lighter constituent collects, as and for the purpose described.

2. A bowl for centrifugal liquid-separators, having an annular shelf and a neck depending from the shelf outside the inner edge thereof, the bottom of the bowl being provided with a cream-discharge at a distance inwardly from the wall of the extended neck, whereby cream collects outside of the discharge and acts to cushion the cream approaching the same, substantially as specified.

3. A bowl for centrifugal liquid-separators, provided with a lower compartment, a discharge-pipe for the heavier constituent, located outside of that portion of the bowl in which the cream collects and passing through said compartment, and with an outlet for the lighter constituent in such compartment, arranged to deliver the said constituent outside of the place of delivery for the heavier constituent, as and for the purpose specified.

4. In a bowl for centrifugal liquid-separators, the combination of a lower shelf, a compartment located below and extending outwardly beyond the inner edge of said shelf, and a discharge-conductor extending from near the wall of the bowl above said shelf downwardly through said shelf and the said compartment and the bottom of the bowl, whereby no impediment to the flow of or churning effect upon an annular body of a lighter constituent within the bowl is occasioned by said discharge-conductor, substantially as specified.

5. In a centrifugal liquid-separator, the combination, with a bowl having a neck extended beyond that portion of the bowl in which is formed the cream-line, a series of annular shelves or partitions, each having a port, a vertical blade, and a skimmed-milk-discharge conductor extending from near the wall of the bowl through the lower compartment and through the bottom of the neck, of a supply-pipe arranged at a side of the blade opposite that at which said discharge-conductor is arranged, substantially as specified.

6. A bowl for a centrifugal liquid-separator, having a lower shelf and a neck extending outwardly beyond the inner edge of said shelf, and having a cream discharge or outlet in the bottom of and a cream-receiving compartment in the said neck, and a skimmed-milk-discharge-pipe passing through said shelf and compartment and through the bottom of said neck at a point nearer the axis of the bowl than said cream discharge or outlet, substantially as specified.

7. A bowl for a centrifugal liquid-separator, having a neck extended outwardly beyond the opening leading from the bowl into said neck, the neck forming a receiving-compartment for a lighter constituent, the bowl also being provided with a discharge-conductor for a heavier constituent, said conductor being arranged to pass from near the wall of the bowl downwardly back of and below that part of the bowl in which the lighter constituent collects and through said compartment, substantially as specified.

In testimony whereof I affix my signature in presence of two witnesses.

CHARLES D. SHEPARD.

Witnesses:
  E. B. STOCKING,
  L. C. HILLS.